Aug. 30, 1938.   J. S. DONALDSON   2,128,803
COUPLING
Filed Aug. 31, 1936
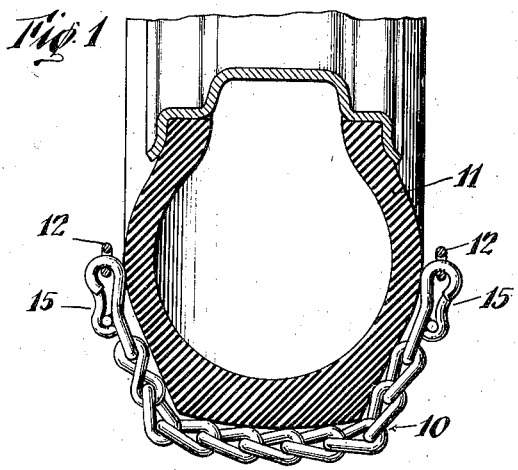
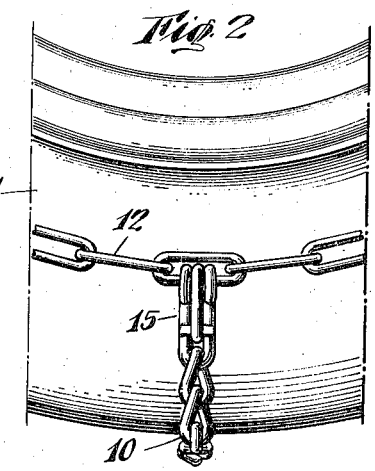
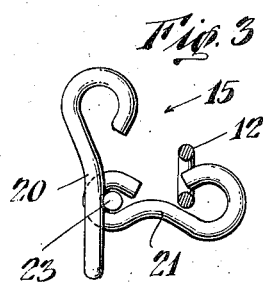
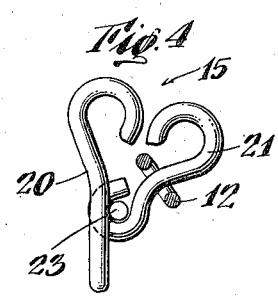
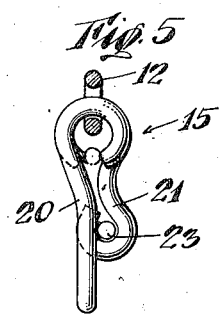
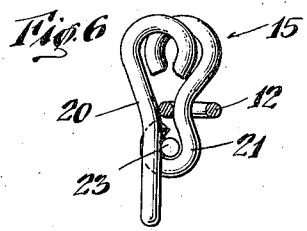
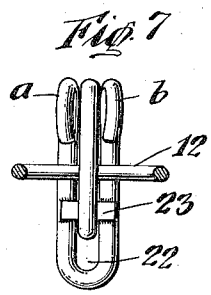
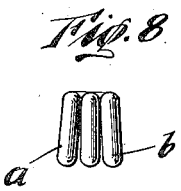
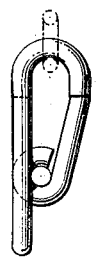
INVENTOR
John Chapman Donaldson
BY Arthur L. Kent
his ATTORNEY Patented Aug. 30, 1938

2,128,803

UNITED STATES PATENT OFFICE 2,128,803

COUPLING

John Shearman Donaldson, St. Albans, N. Y.

Application August 31, 1936, Serial No. 98,660

5 Claims. (Cl. 152—14)

This invention relates to anti-skid tire chains for vehicle wheels, and more particularly to the couplings for connecting the chains which extend across the tread of the tire to the chains which extend circumferentially along the sides of the tire. The object of the invention is to provide an improved coupling for connecting the ends of the cross chains to the side chains which shall securely hold the cross chains and shall be readily operable for removing a worn or broken cross chain and for connecting a new cross chain to the side chains.

The coupling heretofore commonly used for this purpose is a double hook formed of a single length of wire bent to form a loop at its shank end by which the hook is connected to the end link of the cross chain. After the hook ends of such a coupling have been passed through the link of the side chain, they are bent inwardly toward the shank to close the hook so that it cannot then be detached from the side chain without bending the ends outwardly. A tool is required for bending these hook ends outwardly and for bending them inwardly when a new cross chain is attached; and in most positions of the cross chain on the wheel it is impossible to remove and replace a broken cross chain without removing the side chains from the wheel. Also, such couplings must be made of metal which is soft enough not to be too resistant to bending.

The coupling of the present invention comprises two pivotally connected hooks, one a double, or split, hook and the other a single hook, the two hooks facing in opposite directions toward each other and adapted to be brought into register with each other with the hook portion of the single hook housed between the two hook portions of the split hook, so that when coupled to the side chain the two hooks are locked in closed holding position so long as the link of the side chain extends between the backwardly turned hook ends. The new coupling may be connected to and disconnected from the side chain without the use of any special tool, and usually without the use of any tool whatever, and can so readily be connected and disconnected that a broken cross chain may be replaced without removing the side chains from the wheel. And since no part of the device has to be bent in coupling or uncoupling, it may be made of hard rigid metal such as hardened and tempered steel, giving greater strength and resistance to bending strains than the softer metal of which hooks must be made which have to be bent in attaching and detaching.

In the accompanying drawing:

Fig. 1 is a cross sectional view of a tire fitted with anti-skid chains and showing the cross chain provided with couplings according to the invention;

Fig. 2 is a side view of a part of the tire and chains of Fig. 1;

Fig. 3 is a side view of a coupling embodying the features of the invention in the form now considered best, the coupling being shown in open position and about to be connected to a side chain link shown in section;

Fig. 4 is a similar view, but showing the coupling partly closed;

Fig. 5 is a similar view with the coupling closed;

Fig. 6 is a side view of the coupling, illustrating the initial movement in opening the coupling;

Fig. 7 is a view looking from the right of Fig. 6;

Fig. 8 is an end view of the coupling with the hooks in closed position; and

Fig. 9 is a side view of a modified form of the coupling in closed position.

Referring to the drawing, Figs. 1 and 2 show a cross chain 10 provided with couplings 15 in accordance with the invention, in position on a tire 11, the cross chain being coupled to the usual side chains 12.

As shown in Figs. 3 to 8, each coupling 15 is formed by two hooks 20 and 21, the hook 20 being a split, or double, hook having two hook ends $a$ and $b$, and the hook 21 being a single hook pivotally connected by its shank portion to the shank portion of the double hook 20 and adapted to enter between the two hooked portions of the double hook when moved to closed position as shown in Figs. 5 and 8, the hook ends of the double hook being spaced apart sufficiently to permit the single hook to be thus entered between them to bring the two hooks into register. The hooks are U-hooks, that is, they have their hook ends bent to extend backward toward their shank portions, so that, when they are in closed position in register with each other and a chain link or other article extends through the closed loop or space within the hooked ends, the hooks are thereby locked together and cannot open to release the link or other article so long as it lies within the space between the turned-back ends of the two hooks.

The hooks are most desirably made of steel wire bent to the shape shown and then hardened and tempered, or of other suitable hard rigid material, the double hook 20 being formed most desirably from a single length of wire bent to provide a loop 22 at its shank end by which the coupling may be attached to the end link of the cross chain or other article, and the shank end of the wire forming the single hook 21 being bent to form a loop by which the hook is pivotally mounted on a cross bar 23 welded to the shank portion of the double hook the two parts of which are spaced to permit the pivot-eye portion of the single hook to extend between them.

In attaching the coupling to a chain, the coupling is opened more or less as shown in Fig. 3, and the chain link is then slipped over the end of the single hook and turned and slid around the hook portion and back over the shank portion of the single hook to a position as shown in Fig. 4 so that the single hook may then be swung to its closed position between the hook portions of the double hook. When the hooks are in closed position as shown in Fig. 5, the chain link is moved out to the space between the hook ends of the two hooks. Then, so long as the link extends through the hooks between the hook ends thereof, the hooks will thereby be locked together and the coupling cannot become uncoupled from the chain to which it has been attached. To detach the coupling from the chain, the above operations are reversed, that is, the link to which the coupling is attached is moved inward past the hooked ends, and the single hook is then turned outward away from the double hook and the chain link is moved around the hook and off from the end thereof.

The coupling is most desirably made so that when the hooks have been closed together in registering position they will be held together independently of the chain link or other article extending through the hook. For this purpose, in the construction shown, the hook ends of the double hook are made to have a slight flare outward toward the front of the hook and are spaced so that the distance between the front parts thereof is slightly greater, and the distance between the rear parts slightly less, than the thickness of the hook end of the single hook, so that when the two hooks have been moved into register the single hook will be wedged between the two hook portions of the double hook, as shown in Fig. 8, and will thereby be frictionally held in such position.

In order to aid in opening the coupling when its two hooks are so frictionally held in closed position, the hooks are most desirably shaped so that by moving the chain link to which they are connected inward from the hook ends the two hooks may be forced apart sufficiently to break the friction grip of the double hook on the single hook. For this purpose, as shown, the shank portions of the two hooks are so shaped that they are inclined toward each other in the direction toward their pivotal connection with the distance between them somewhat less than the thickness of the chain link. By pushing the link inward, the two hooks may be forced apart, as indicated by Fig. 6, sufficiently to break the friction grip by which they are normally held closed together, and, the friction grip having been thus broken, the hooks may then readily be swung to open position by the fingers.

The extreme tip ends of the hooks are most desirably shaped to extend inwardly sufficiently so that when the hooks are in register in closed position the space between the ends will be only just sufficient to permit the chain link to which the coupling is attached to pass. This ensures full closing of the coupling in attaching it to a chain link, since, if the coupling has not been fully closed when the chain link is moved out to its position between the hook ends, then by engagement of the link with the inwardly extending hook ends the hooks will be forced to their fully closed relative positions, in which they will then be held by the grip of the double hook on the single hook. By this formation of the hooks, also, the possibility of accidental opening of the coupling is reduced, since the chain link will be hindered from moving inward to act against the inclined cam faces of the shank portions of the hooks.

Fig. 9 shows a coupling similar to that of Figs. 3 to 8, except that the shank portions of the hooks are not shaped to provide cam faces to assist in the opening of the coupling, and the hook ends are not extended inward for ensuring complete closing of the coupling. A coupling of this kind, if the hooks are held too firmly in closed position by the wedging action of the double hook on the single hook, may be readily opened by inserting a tool such as the blade of a screw driver between the shanks of the hooks, and giving it a twist.

What is claimed is:

1. A coupling comprising two pivotally connected U-hooks facing in opposite directions, one of the hooks being a single hook and the other being a double hook, the hook portions of which are spaced to permit the hook portion of the single hook to enter between them, and the double hook being formed of a single length of wire bent to provide a loop at the shank end of the hook and having a cross-bar welded thereto on which the single hook is pivotally mounted.

2. A coupling comprising two pivotally connected U-hooks facing in opposite directions, one of the hooks being a single hook and the other being a double hook the hook portions of which are spaced to permit the hook portion of the single hook to enter between them, and the hook portions of the double hook being flared outward slightly toward the front thereof with the space between the front parts thereof slightly greater and the space between the rear parts thereof slightly less than the thickness of the hook end of the single hook, so that when the hook portion of the single hook has been pushed between the hook portions of the double hook and into register therewith the hooks will be frictionally held in such relation.

3. A coupling as in claim 2, in which the hooks are so shaped that when in closed position the shank portions of the two hooks will be inclined toward each other in the direction toward their pivotal connection and spaced apart a distance less than the thickness of the part to which the coupling is to connect.

4. A coupling as in claim 2, in which the extreme ends of the hooks extend inwardly sufficiently to permit passage of the part to which the coupling is to connect only when the coupling is fully closed.

5. A coupling, comprising a double hook formed of a single piece of wire bent at its center to form a loop with the ends bent over perpendicular to the plane of the loop to form U-hooks, a cross-bar welded to the two sides of the loop, and a single hook formed of a single piece of wire with one end curled around the cross-bar and extending into the space between the sides of the loop and the other end bent over perpendicular to the plane of the loop to form a U-hook facing the hooks of the double U-hook.

JOHN SHEARMAN DONALDSON.